United States Patent [19]

Gutierrez et al.

[11] Patent Number: 4,779,634

[45] Date of Patent: Oct. 25, 1988

[54] APPARATUS FOR RINSING FOOD PARTICLES IN A CONTAINER

[75] Inventors: Daphne Gutierrez, Simi Valley; Roger D. Johnson, Canyon Country, both of Calif.

[73] Assignee: Nestec, S.A., Vevey, Switzerland

[21] Appl. No.: 77,483

[22] Filed: Jul. 24, 1987

[51] Int. Cl.$^4$ ............................ B08B 3/04; B08B 9/08
[52] U.S. Cl. .................................... 134/133; 134/150; 134/151; 134/171; 99/536; 141/89; 141/170; 210/348; 210/359
[58] Field of Search ...................... 134/61, 62, 82, 120, 134/133, 150, 155, 159, 171; 210/380.1, 380.3, 359, 348; 99/536; 141/85, 89, 92, 122, 170

[56] References Cited

U.S. PATENT DOCUMENTS

| | | | |
|---|---|---|---|
| 1,416,345 | 5/1922 | Gosselin | 141/170 |
| 1,449,247 | 3/1923 | Rarig | 141/122 |
| 1,714,114 | 5/1929 | Thompson | 141/122 |
| 1,811,908 | 6/1931 | De Back | 141/122 |
| 2,268,563 | 1/1942 | Ball | 141/92 X |
| 2,333,232 | 11/1943 | Bleam et al. | 141/170 |
| 2,525,141 | 10/1950 | Leuschner | 141/170 |
| 2,865,411 | 12/1958 | Johnson et al. | 141/92 |

Primary Examiner—Harvey C. Hornsby
Assistant Examiner—Stephen F. Gerrity

[57] ABSTRACT

An apparatus for rinsing extruded pasta product in a container to remove surface starch from the pasta. The apparatus includes a conveyor on which containers holding a portioned amount of extruded pasta product are conveyed upright in single file, a manifold for introducing hot rinse water into the containers, and a rotary draining unit in which the water-filled containers are first inverted to drain off the rinse water and are then returned to an upright position for transfer to additional processing operations such as sauce filling, container sealing, retorting and cooling. A stationary slide plate is provided between the conveyor and the rotary draining unit, and reciprocating arms are mounted adjacent the slide plate to move the water-filled containers from the conveyor across the slide plate and into the rotary draining unit. The rotary draining unit includes a pair of horizontally extending support surface mounted equidistant from and parallel to a central shaft around which the support surfaces rotate. A perforated plate is mounted above both of the support surfaces to retain the containers thereon as the draining unit is rotated and the jars are inverted, and permit draining of the rinse water from the containers when they are rotated to an inverted position.

7 Claims, 2 Drawing Sheets

APPARATUS FOR RINSING FOOD PARTICLES IN A CONTAINER

BACKGROUND OF THE INVENTION

This invention relates to apparatus for rinsing food particles in a container. More particularly, the invention relates to apparatus for rinsing pieces of extruded pasta product in containers in order to remove surface starch from the pasta.

In the manufacture of thermally processed entrees containing spaghetti, macaroni or other extruded pasta products and sauce, in which freshly extruded pasta material is filled into containers, the pasta pieces have a tendency to clump or mat together unless the containers are agitated during thermal processing. This clumping or matting, which is commercially undesirable, is due to the presence of surface starch on the extruded raw pasta pieces. Such clumping can be minimized by agitating the pasta-filled containers, such as by the use of a rotary retort in heat processing the filled containers, since the action of the rotary retort is effective in continuously coating the pasta pieces with sauce, with the surface starch being distributed into the sauce. In many circumstances, however, a suitable rotary retort is not available due to cost considerations, or due to the size or type of container utilized. Alternatively, clumping or matting of the pasta pieces can be minimized by first placing the extruded pasta pieces in hot water to remove the accumulation of surface starch, removing the pasta pieces from the hot water and introducing the drained pasta into a container. However, this requires double handling of the pasta pieces and, since the pasta pieces become softened upon introduction into the hot water, results in unacceptable levels of damage to the soft pasta pieces during the filling operation. Similarly, if dried pasta pieces, rather than freshly extruded pasta, are used in the production of such canned products, the dried pieces must first be blanched in hot water to hydrate and soften the pasta and remove surface starch, and the hydrated pasta removed from the blanch water and filled into containers. Here again the soft pasta pieces are subject to damage during the filling operations.

Accordingly there is a need for a system for removing surface starch from extruded pasta pieces without the necessity of double handling of the soft pasta pieces and which does not require the use of a rotary retort.

SUMMARY OF THE INVENTION

The present invention provides a rinsing apparatus for removing surface strarch from spaghetti strands or other extruded pasta pieces in glass jars or other containers in a commercial canning operation which is not subject to the disadvantages inherent in prior manufacturing operations. A portioned amount of the pasta product, such as spaghetti, is extruded into or otherwise placed in glass jars or other suitable containers, and the jars carried on a conveyor in an upright position in single file under a water manifold. Hot rinse water is introduced into a predetermined number or set of the jars on the conveyor from a plurality of nozzles positioned above the conveyor. The set of jars into which rinse water has been added is transferred from the conveyor into a rotary draining unit in which the jars are rotated around a central shaft, with the jars first being rotated to an inverted position in which the rinse water is drained from the jars, and are then rotated back to an upright position for discharge from the draining unit. The draining unit is provided with a pair of horizontally disposed support surfaces, onto which sets of jars containing pasta and rinse water are loaded, spaced equidistant from the central shaft. When one set of jars, which has been loaded onto one support surface, is rotated to an inverted position, a second set of jars is loaded in an upright position onto the other support surface. Rotation of the draining unit brings the drained set of jars back to an upright position while the second set of jars is rotated to an inverted position. The drained set of jars are discharged from the draining unit upon introduction of a third set of jars into the unit. Transfer means are provided for conveying the drained jars to additional processing operations, such as filling with sauce, container sealing, shaking and thermal processing. The apparatus of the invention also includes means for synchronizing the transfer of sets of jars from the conveyor into and out of the draining unit with the rotation of the draining unit.

DESCRIPTION OF THE DRAWINGS

FIG. 1 illustrates the operative condition after rinse water has been introduced into the jars; FIG. 2 illustrates the operative condition at a point during the transfer of a set of jars from the conveyor into the rotary draining unit; FIG. 3 illustrates the operative condition as the set of jars is introduced into the draining unit;

DETAILED DESCRIPTION

Figure 1:
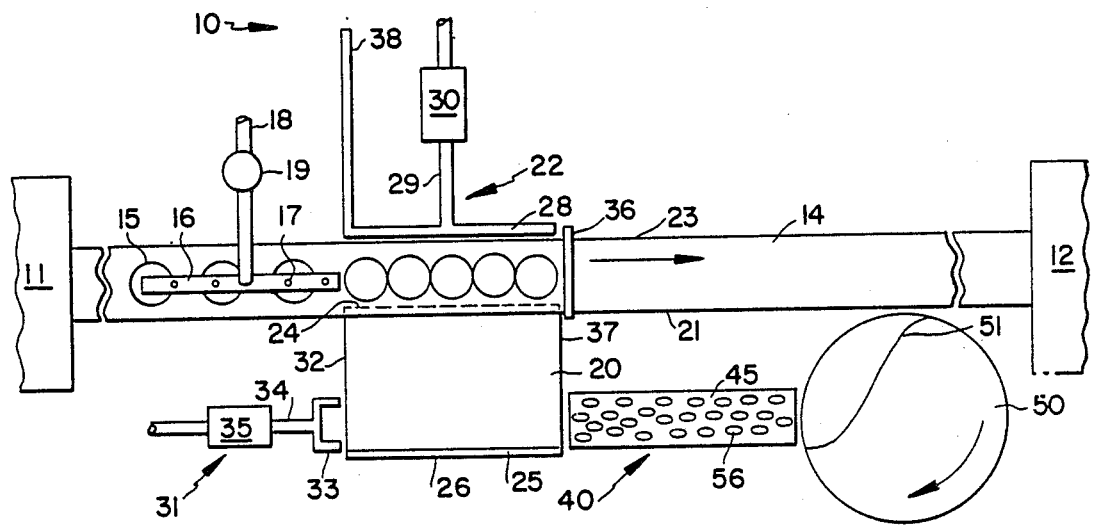
FIGS. 1–3 are a top plan view of the apparatus of the present invention showing the apparatus in different operational phases; that is.
Figure 2:
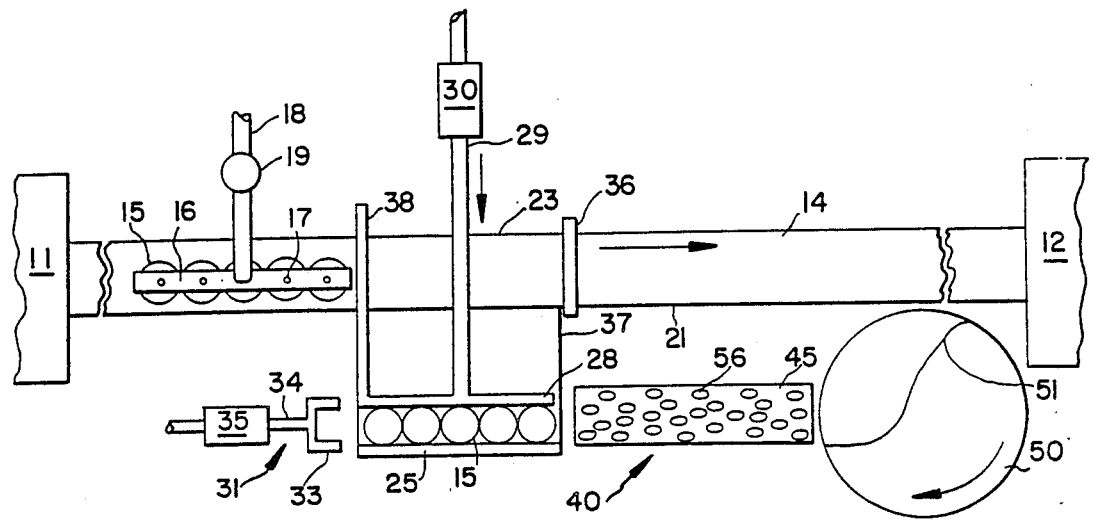
Figure 3:
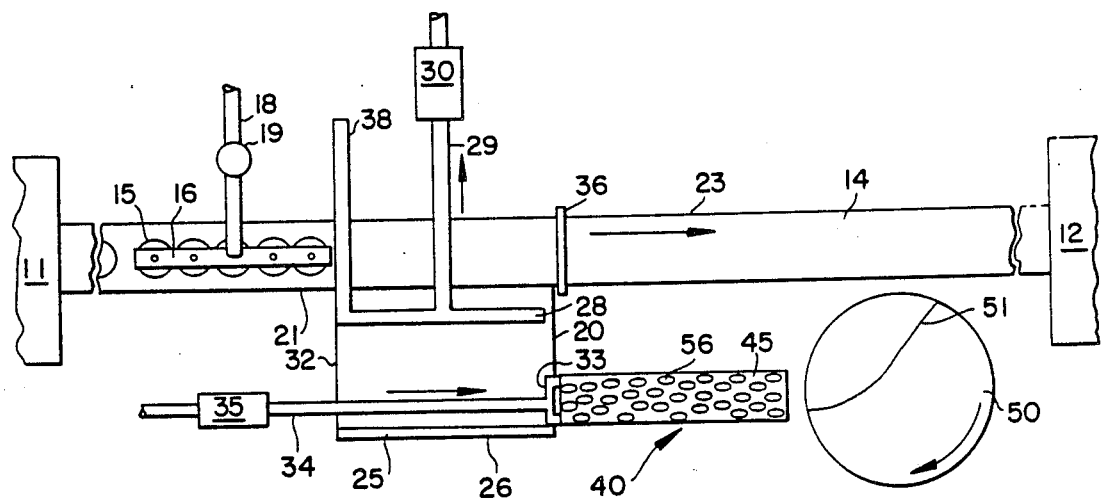

Referring now to the drawings, particularly FIGS. 1–3, the rinsing apparatus of this invention, generally designated by numeral 10, is positioned in a canned pasta manufacturing operation between filling unit 11, in which a portioned amount of a desired pasta product, such as spaghetti strands, is extruded into glass jars or other suitable containers, and unit 12 in which the jars are subject to further processing operations, such as sauce filling, container sealing and shaking, thermal processing and cooling. In the rinsing apparatus 10, hot rinse water is introduced into the pasta-containing jars, and the rinse water is subsequently drained from the jars to thereby remove excess surface starch from the pasta prior to the processing operations. Endless conveyor belt 14, formed of any suitable material such as metal mesh, neoprene, and the like, carries the containers between units 11 and 12 in the indicated by the arrow. Conveyor belt 14 is conventional in construction, having substantially horizontal upper and lower runs which extend around an idler wheel and a drive wheel (not shown) at opposite ends of the belt, with the belt 14 being driven at a desired speed by conventional motor means (not shown).

The rinsing apparatus of the present invention includes a water manifold 16 mounted above conveyor 14 for introducing rinse water into the pasta-containing jars carried on the conveyor; a stationary slide plate 20 positioned adjacent the conveyor belt, onto which the jars containing pasta and rinse water are transferred from the conveyor by a first reciprocating arm 22; and a rotary draining unit 40 adjacent the slide plate into which the jars are transferred from the slide plate by a second reciprocating arm 31 and are inverted to drain off the rinse water. Rotary turntable 50 mounted adjacent the discharge end of draining unit 40 carries the drained, pasta-containing jars back onto conveyor 14 for further processing operations in Unit 12.

The jars 15, into which spaghetti has been extruded in unit 11, are placed on conveyor 14 in an upright position, spaced apart, in single file. To facilitate processing of the jars in the rinsing apparatus, the spaced apart jars carried on a conveyor 14 are accumulated into sets of jars in which adjacent jars are in contact. For the purpose of illustrating the invention, FIGS. 1 to 3 show the jars being processed in sets of 5 jars. However, it will be understood that the jars may be accumulated into sets comprising from 3 to 15 or more jars, depending on the size of the jars, the line speed, the dimensions of the rinsing apparatus, and the like. As the pasta-containing jars 15 are carried on conveyor 14 from unit 11, movement of the jars is halted by stop plate 38 carried on reciprocating arm 22 (FIG. 2) so that the spaced-apart jars accumulate into sets on the conveyor. Water manifold 16 is mounted above the center line of conveyor 14 adjacent stop plate and extends parallel to the conveyor. Manifold 16 is provided with a number of downwardly facing spray nozzles 17, with the number of nozzles corresponding to the number of jars in the set. The nozzles 17 are spaced apart a distance equal to the spacing between the centers of directly contacting jars in a set, and are adapted to introduce a preset volume of hot rinse water into each of the jars in a set carried beneath the manifold 16. Hot water (85° C.–95° C.) is supplied to manifold 16 by inlet pipe 18, with the flow of hot water into the manifold being controlled by valve 19, which is activated by a limit switch (not shown).

Stationary slide plate 20 is mounted adjacent one edge 21 of the conveyor belt, and reciprocating arm 22 is mounted adjacent edge 23 of the conveyor opposite the stationary slide plate 20. Slide plate 20 has a substantially flat upper surface and is mounted horizontally, so that the upper surface of the slide plate is substantially co-planar with or slightly below the upper run of conveyor belt 14. According to a preferred embodiment, one edge 24 of the slide plate extends a slight distance immediately under the upper run of the conveyor belt to facilitate transfer of the set of jars from the conveyor onto the slide plate. A raised stop member 25 is secured along the edge 26 of the slide plate to ensure that the jars are retained on the plate and to maintain proper alignment of the jars as they are moved from the conveyor. Stop plate 36 is secured across conveyor 14, above the upper run thereof, adjacent the downstream end 37 of the slide plate to stop the movement of the set of jars on the conveyor at a point opposite the slide plate. As can be seen in FIG. 2, the jars are transferred as a set from conveyor belt 14 onto the slide plate by means of reciprocating arm 22, with the set of jars being moved from the conveyor to the edge 26 of the slide plate opposite the conveyor. Reciprocating arm 22 is positioned above the upper run of the conveyor and is mounted adjacent edge 23 of the conveyor opposite slide plate 20. Arm 22 is mounted for reciprocatory movement from a retracted position (FIG. 1) to an extended position (FIG. 2) to move the jars, as a set, from conveyor belt 14 across the slide plate 20 to end 26 thereof, at which time arm 22 is returned to its retracted position. Reciprocating arm 22 includes a plate member 28 which is mounted parallel to the longitudinal axis of conveyor 14 and has a longitudinally extending bar secured at right angles at the midpoint of plate 28. Stop member 38 is fixed to the upstream end of plate 28 at right angle thereto, and has a length such that when arm 22 is fully extended, stop member 38 extends across conveyor 14. Bar 29 extends through an air cylinder 30 which effects reciprocating movement of the plate member 28 between two operative positions, that is, a retracted position (FIG. 1) and an extended position (FIG. 2). A conventional limit switch (not shown) is provided at stop plate 36 and is operatively connected to air cylinder 30 to actuate the air cylinder and produce reciprocatory movement of plate 28.

A second reciprocating arm 31 is positioned above the upper surface of slide plate 20 and is mounted adjacent end 32 of the slide plate at edge 26 thereof, to move the set of jars, in single file order, from the slide plate into draining unit 40. Reciprocating arm 31 is disposed and moves the set of jars in a direction perpendicular to that of arm 22, as shown in FIG. 3. Thus, arm 31 includes a U-shaped channel member 33 secured to a longitudinally extending bar 34, with reciprocating movement of arm 31 being effected by air cylinder 35, through which bar 34 extends, and conventional actuating means (not shown) to move arm 31 between a retracted position (FIG. 2) and an extended position (FIG. 3).

Figure 4:
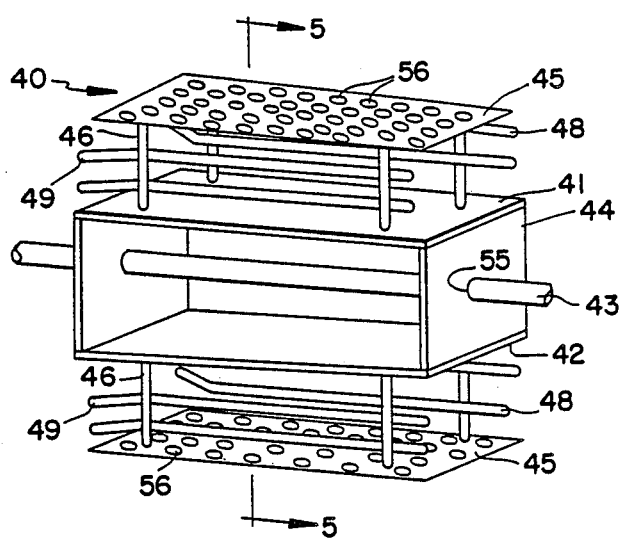
FIG. 4 is a perspective view of the draining unit of the present invention.
Figure 5:
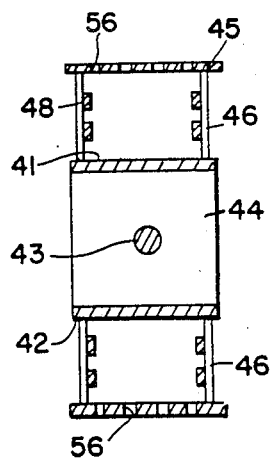
FIG. 5 is a sectional view of the draining unit taken along line 5—5 of FIG. 4.

The jars are transferred from slide plate 20 into draining unit 40 in which the jars are first inverted to drain off the rinse water and are then returned to an upright position. As shown in FIGS. 4 and 5 the draining unit includes a pair of elongated, support surfaces 41 and 42 onto which the set of jars is moved from the slide plate, with the support surfaces being parallel to and spaced equidistant from a central shaft 43. Thus, the support surfaces are mounted in opposing relationship on opposite sides of shaft 43, that is, surface 41 is mounted 180° from surface 42. The shaft 43 extends substantially horizontally through openings 55 in end walls 44 to which the support surfaces 41 and 42 are secured, with the opposite ends of the shaft being rotatably supported on conventional bearing assemblies (not shown). Shaft 43 is mounted substantially parallel to the edge 26 of the slide plate. According to one embodiment of the invention, shaft 43 is fixed in position and support surfaces 41 and 42 are mounted for 360° rotation around the shaft. Alternatively, shaft 43 may be mounted for rotation and support surfaces 41 and 42 operatively connected to the shaft for 360° rotation with the shaft. When the draining unit 40 is in an upright position, support surfaces 41 and 42 are in a horizontal position, with the upper support surface being substantially co-planar with the surface of the slide plate and the lower support surface facing in a downward direction. Upon rotation of the draining unit 180°, the support surfaces are also rotated 180° with the other support surfaces being co-planar with the surface of the slide plate. A perforated member 45, such as a perforated plate, wire mesh screen, and the like having a plurality of opening 56 therethrough is mounted over and substantially parallel to both of the support surfaces 41 and 42, by any suitable means such as jars 46 which are secured to the support surfaces and the perforated members at the corners thereof. The perforated members 45 are secured above the support surfaces a distance slightly greater than the height of the jars being processed to facilitate loading of the jars onto the support surfaces while preventing substantial movement of the jars when the unit is rotated to invert the jars. The openings 56 in plate 45 are sufficient in size and number to permit the rinse water to drain freely from the jars when the jars are inverted but retain the pasta product in the jars. Preferably, openings 56 are about 1.5 to 6.5 mm in size. Side rails 47 and 48 are provided along both side edges of support surfaces 41 and 42 to guide jars on the support surfaces, with the side rails at the inlet end 49 of the draining unit being flared outwardly to facilitate transfer of the jars from the slide plate onto a support surface.

It will be noted that when the draining unit 40 is rotated so that one of the support surfces, e.g. 41, is adjacent the surface of the slide plate 20 for the transfer of a set of glass jars into the draining unit, the other support surface e.g. 42 will be positioned 180° from surface 41, so that the set of jars initially loaded on support surface 42 in an upright position will be inverted, whereby the rinse water will be drained from the jars. A subsequent 180° rotation of unit 40 will bring the jars loaded onto surface 41 to an inverted draining position and return the drained jars on surface 42 to an upright position. At this point another set of jars is transferred from slide plate 20 onto support surface 42 thereby moving the drained jars out of unit 40.

The drained jars are discharged from draining unit 40 onto turntable 50, moving in the direction of the arrow, which acts in cooperation with accurate guide rail 51 to deliver drained, upright jars to conveyor 14 for further processing operations in unit 12, such as sauce filling, container sealing and shaking, thermal processing and cooling.

The operation of the apparatus will be briefly described to ensure a complete understanding thereof.

Glass jars or other suitable containers into which a portioned amount of spaghetti or other pasta product has been extruded in filling unit 11 are placed upright, in single file, on conveyor 14 and are carried away from filling unit 11. As the jars are carried below manifold 16, (which has five, downwardly facing nozzles spaced apart a distance equal to the spacing between the centers of directly contacting jars in the set) the lead jar contacts stop member 38 (FIGS. 2 and 3), which stops movement of the lead jar and causes adjacent jars to accumulate as a set behind the lead jar. When the desired number of jars have accumulated as a set, valve 19 is opened, and the jars are filled with hot rinse water (85° C.–95° C.). At this point, reciprocating arm 22 is moved to its fully retracted position (FIG. 1) so that the set of water-containing jars carried on conveyor 14 until the lead jar in the set contacts stop plate 36 at which point air cylinder 30 is actuated to move the first reciprocating arm 22 from its retracted position to an extended position (FIG. 2), thereby moving the set of jars off conveyor 14 across slide plate 20 to the edge of the slide plate opposite the conveyor, at which time arm 22 is returned to its retracted position (FIG. 1). As shown in FIG. 2, the jars are maintained in single file order as they are moved across the slide plate. When first reciprocating arm 22 has been retracted, air cylinder 35 is actuated to move the second reciprocating arm 31 from its retracted position (FIG. 2) to an extended position (FIG. 3), thereby moving the set of jars from the slide plate onto one of the support surfaces (e.g. 41) of draining unit 40, at which time arm 31 is returned to its retracted position. Draining unit 40 is then rotated 180° around shaft 43 to bring the first set of jars into an inverted position whereby the rinse water is drained from the jars through the openings on perforated plate 45 while the pasta product is retained in the jars.

This sequence of steps is then repeated with additional sets of jars. Thus, as the first reciprocating arm 22 is being returned to its retracted position, additional jars accumulate as a set under water manifold 16, and are filled with rinse water. When arm 22 is fully retracted the set of jars is moved until the lead jar contacts stop plate 36, at which time the second set of jars is transferred across slide plate 20, through the sequential extention and retraction of reciprocating arms 22 and 31, onto the other support surface (e.g. 42) of draining unit 40. The draining unit is then rotated 180° to bring the second set of jars to an inverted position for draining and return the drained first set of jars to an upright position. When a third set of jars (not shown) is moved from the conveyor across the slide plate onto support surface 41 of the draining unit by the sequential extension and retraction of arms 22 and 31, the drained first set of jars on surface 41 are forced out of the draining unit onto turntable 50 from which they are carried to conveyor 14 for additional processing in unit 12. This sequence of steps is continuously repeated, thereby effectively rinsing the extruded pasta material in the jars.

What is claimed is:

1. An apparatus for rinsing food particles in containers which consists essentially of a stationary slide plate having a planar surface, endless conveyor means for carrying containers, into which food particles have been introduced, in single file order, said conveyor means having an upper surface adjacent one longitudinal edge of the planar surface of said slide plate, means for introducing an aqueous liquid into a predetermined number of the containers on said conveyor means, rotary draining means mounted adjacent an end of said stationary slide plate remote from said conveyor means and substantially parallel to said conveyor means for draining the aqueous liquid from the containers, said draining means including a pair of elongated support surfaces spaced equidistant from a central shaft around which the support surfaces rotate, and perforated means mounted above said support surfaces, means for rotating said draining means around said shaft, a first reciprocating arm mounted adjacent the conveyor means and extending across said longitudinal edge of the slide plate, adapted to transfer said predetermined number of containers into which the aqueous liquid has been introduced from the conveyor means to the edge of the stationary plate remote from said conveyor means, a second reciprocating arm mounted adjacent an end of the stationary plate opposite said rotary draining means, adapted to move said predetermined number of containers in a direction perpendicular to the direction of said first reciprocating arm whereby said containers are transferred from the stationary plate onto one of the support surfaces of said rotary draining means, and means for sequentially actuating said first and second reciprocating arms.

2. The apparatus defined in claim 1 in which transport means is provided adjacent the end of the rotary draining means opposite said stationary slide plate for conveying containers away from the rotary draining means.

3. The apparatus defined in claim 1 in which said rotary draining unit comprises a pair of elongated horizontally extending support surfaces mounted parallel to said central shaft, said support surfaces being mounted in opposing relationship on opposite sides of said shaft.

4. The apparatus defined in claim 3 in which said support surfaces are mounted a distance from the shaft so that one of said surfaces is substantially co-planar with the stationary slide plate and the other support surface is spaced 180° from said one surface.

5. The apparatus defined in claim 3 in which the perforated means is mounted above and extends over both of said support surfaces a distance sufficient to permit the containers to be transferred from the slide plate onto a support surface and which retains the containers on the support surface when the support surface is rotated about the central shaft.

6. The apparatus defined in claim 1 in which said first arm reciprocates in a direction perpendicular to the endless conveyor, and said second arm reciprocates in a direction parallel to said endless conveyor.

7. The apparatus defined in claim 1 in which said second arm is mounted adjacent the longitudinal edge of the stationary plate remote from said conveyor means.

* * * * *